(12) United States Patent
Jansen et al.

(10) Patent No.: US 8,900,061 B2
(45) Date of Patent: Dec. 2, 2014

(54) CLUTCH DEVICE

(75) Inventors: Andre Jansen, Borken (DE); Robert Peters, Bocholt (DE)

(73) Assignee: Siemens Aktiengesellschaft, München (DE)

( * ) Notice: Subject to any disclaimer, the term of this patent is extended or adjusted under 35 U.S.C. 154(b) by 266 days.

(21) Appl. No.: 13/306,362

(22) Filed: Nov. 29, 2011

(65) Prior Publication Data

US 2012/0132497 A1    May 31, 2012

(30) Foreign Application Priority Data

Nov. 29, 2010 (EP) .................................... 10015090

(51) Int. Cl.
*F16D 3/62* (2006.01)
*F16D 3/18* (2006.01)

(52) U.S. Cl.
CPC . *F16D 3/62* (2013.01); *F16D 3/185* (2013.01)
USPC ............................... 464/69; 464/85; 464/158

(58) Field of Classification Search
USPC ........ 464/69, 70, 156, 158, 159, 85; 192/48.5
See application file for complete search history.

(56) References Cited

U.S. PATENT DOCUMENTS

| | | | |
|---|---|---|---|
| 1,659,353 A * | 2/1928 | Dwyer | ........................ 464/69 X |
| 3,013,411 A * | 12/1961 | Wahlmark | .................... 464/158 |
| 7,104,892 B2 | 9/2006 | Cordts et al. | |
| 7,985,141 B2 | 7/2011 | Spensberger | |
| 2009/0139425 A1* | 6/2009 | Spensberger | |

FOREIGN PATENT DOCUMENTS

| | | |
|---|---|---|
| DE | 100 50 757 A1 | 4/2002 |
| DE | 102 57 018 A1 | 2/2004 |
| DE | 20 2005 015 769 U1 | 2/2006 |
| EP | 1 197 412 A2 | 4/2002 |
| FR | 1.196.352 A | 11/1959 |
| JP | 2007-314133 | 12/2007 |

* cited by examiner

*Primary Examiner* — Gregory Binda
(74) *Attorney, Agent, or Firm* — Henry M Feiereisen LL

(57) ABSTRACT

A clutch device for connecting a driving machine part to a driven machine part comprises an elastomeric clutch which is arranged on a first drive-side or output-side end section of the clutch device. A tooth clutch is arranged on a second output-side or drive-side end section of the clutch device. Moreover, an intermediate shaft which connects the elastomeric clutch to the tooth clutch is provided. Moreover, the tooth clutch and the elastomeric clutch have restoring forces which are adapted to one another in such a way that, in the case of a radial displacement, the clutch device has both central running and axial offset compensation.

8 Claims, 3 Drawing Sheets

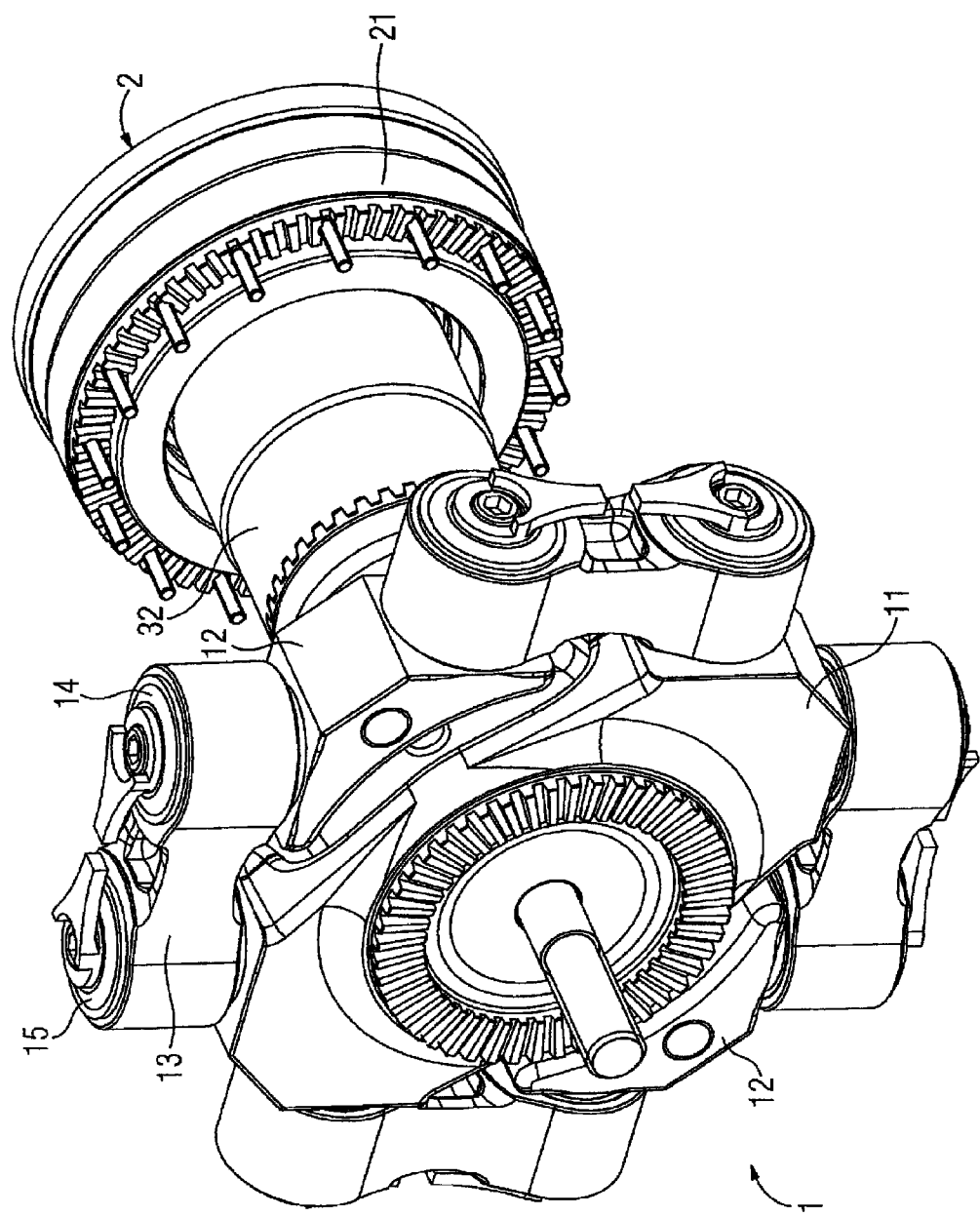

CLUTCH DEVICE

CROSS-REFERENCES TO RELATED APPLICATIONS

This application claims the priority of European Patent Application, Serial No. EP 10015090, filed Nov. 29, 2010, pursuant to 35 U.S.C. 119(a)-(d), the content of which is incorporated herein by reference in its entirety as if fully set forth herein.

BACKGROUND OF THE INVENTION

The present invention relates to a clutch device for connecting a driving machine part and a driven machine part, such as, e.g, shafts, wheel hubs or flanges.

The following discussion of related art is provided to assist the reader in understanding the advantages of the invention, and is not to be construed as an admission that this related art is prior art to this invention.

Conventional clutch devices with a drive-side and an output-side clutch element do not include different clutch types, since otherwise nonuniform restoring forces are produced in clutch elements, which restoring forces can be compensated for only with difficulty. Moreover, connection sections on the clutch elements in conventional clutch devices do not have nonuniform diameters caused by different clutch types, which diameters have previously been considered to be principally undesirable.

It would therefore be desirable and advantageous to provide an improved clutch device which obviates prior art shortcomings and has high torsional rigidity, and which enables a compensation of radial and axial offsets between two rotating machine parts to be connected, and can suppress an electric current flow.

SUMMARY OF THE INVENTION

According to one aspect of the present invention, a clutch device for connecting a driving machine part to a driven machine part includes an elastomeric clutch arranged on a first drive-side end section or an output-side end section of the clutch device, a tooth clutch arranged on a second output-side or drive-side end section of the clutch device, and an intermediate shaft which connects the elastomeric clutch to the tooth clutch, wherein the tooth clutch and the elastomeric clutch have restoring forces which are adapted to one another in such a way that the clutch device has both central running and axial offset compensation in the case of a radial displacement.

A clutch device according to the invention therefore makes an effective compensation of radial and axial offset possible between two rotating machine parts to be connected, and a suppression of a current flow, caused, for example, by electric machines, via a drive train which comprises the clutch device.

The restoring forces can also be adapted to one another in such a way that, during normal operation, the clutch device always runs centrally and can compensate for an axial offset in the case of a predefined start-up torque. The elastomeric clutch and the tooth clutch are advantageously adapted to one another in such a way that resulting radial and axial restoring forces are minimized.

According to another advantageous feature of the present invention, the elastomeric clutch can include a hinged lever clutch, a strap clutch, a spline assembly clutch, a steel disk clutch with an elastomeric intermediate piece, a bolt clutch or a claw clutch. Clutches of this type have satisfactory electrically insulating properties and a high torsional rigidity.

According to another advantageous feature of the present invention, the tooth clutch can have a spiral toothing system. An angular offset between two rotating machine parts to be connected can therefore also be compensated for.

According to another advantageous feature of the present invention, the tooth clutch can be integrated into a transmission hollow shaft. As an alternative to this, the tooth clutch can be mounted in front of the transmission hollow shaft. Advantageously, when the tooth clutch includes inner and outer clutch elements, the outer clutch element can form an extension of the transmission hollow shaft.

According to another advantageous feature of the present invention, a bearing seat for the transmission hollow shaft can be integrated into the outer clutch element. Moreover, the tooth clutch can form a seal of a transmission. An extremely compact design of the drive train can be attained in this manner.

According to another advantageous feature of the present invention, the tooth clutch can include inner and outer clutch elements, and a shock absorbing thrust ring which can be arranged between the outer clutch element and the intermediate shaft. The thrust ring can form a seat for a sealing ring which surrounds the intermediate shaft and a limiting element for axial relative movements between the tooth clutch and the intermediate shaft. Axial movements can therefore be damped and limited effectively.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is perspective illustration of the clutch device of FIG. 1.

DETAILED DESCRIPTION OF PREFERRED EMBODIMENTS

Figure 1:
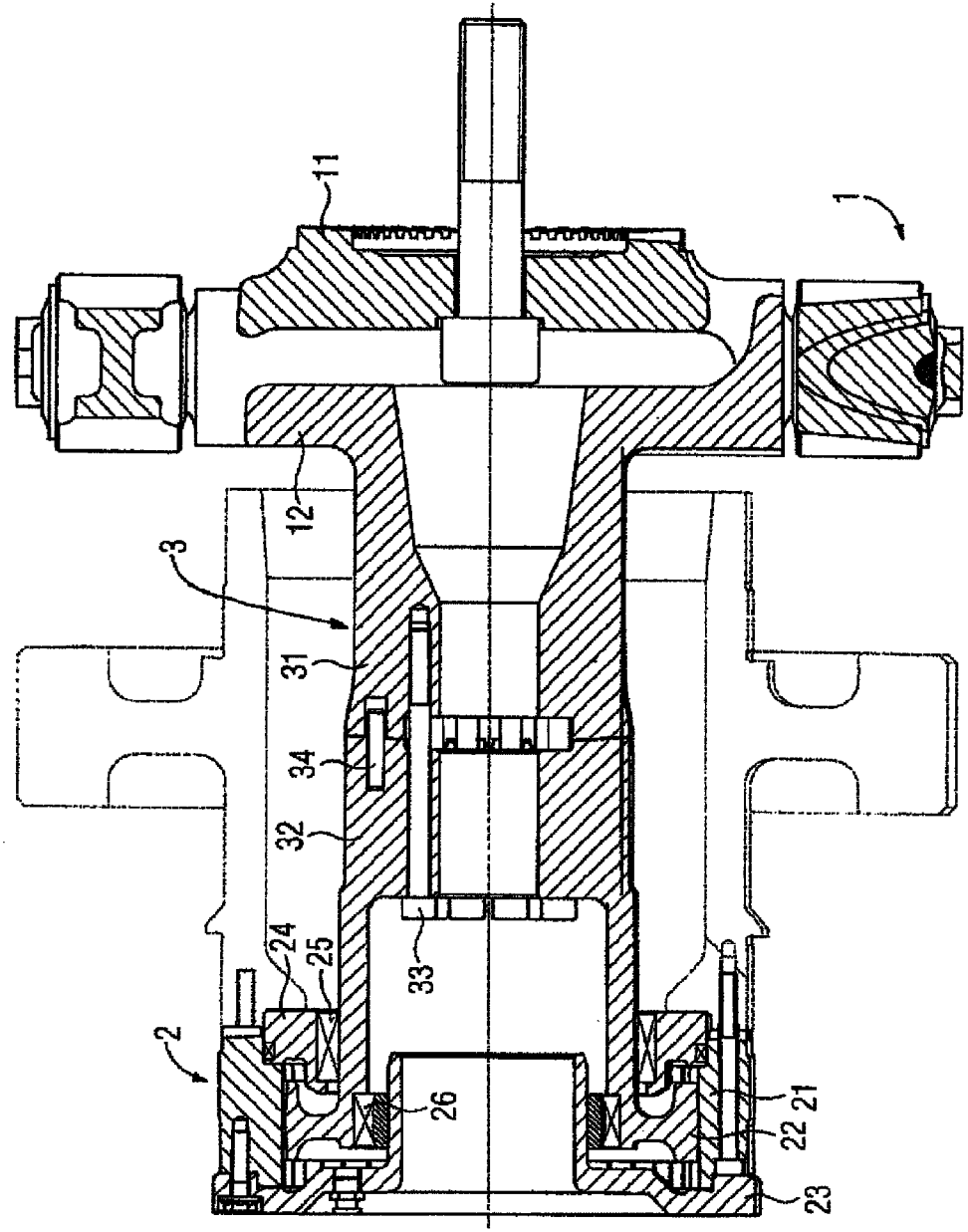
FIG. 1 is a sectional illustration of a clutch device with a tooth clutch and a hinged lever clutch.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional illustration of a clutch device for connecting a driving machine part to a driven machine part. The clutch device includes an elastomeric clutch 1 which is arranged on a first drive-side end section or output-side end section of the clutch device and is designed as a hinged lever clutch in the present exemplary embodiment. In principle, the elastomeric clutch 1 might also be designed as a strap clutch, spline assembly clutch, steel disk clutch with an elastomeric intermediate piece, bolt clutch or claw clutch.

The hinged lever clutch 1 comprises a first connecting flange 11 and a second connecting flange 12 which are connected to one another via four rod elements 13. The first connecting flange 11 of the hinged lever clutch 1 is arranged substantially concentrically within the second connecting flange 12. The second connecting flange 12 has arm-like projections onto which the bearing journals are formed and which engage radially at least partially around the first connecting flange 11 in the present exemplary embodiment.

A tooth clutch 2 which includes an inner clutch element 22 and an outer clutch element 21 is arranged on a second output-side end section or drive-side end section of the clutch device. In the present exemplary embodiment, the outer clutch element 21 forms an extension of a transmission hollow shaft (not shown in greater detail in the figures). Here, the tooth clutch can be integrated into the transmission hollow shaft or can be mounted in front of the latter. Moreover, a bearing seat for the transmission hollow shaft is integrated into the outer clutch element 21.

In the present exemplary embodiment, the tooth clutch 2 has a spiral toothing system and can therefore also compensate for an angular offset between a drive shaft and an output shaft. Furthermore, the tooth clutch 2 can be lubricated with oil or grease.

On a transmission-side end side of the tooth clutch 2, a cover 23 is screwed onto the outer clutch element 21, with the result that the tooth clutch 2 forms a seal of a transmission. A shock absorbing thrust ring 24 is arranged between the outer clutch element 21 and an intermediate shaft 3 which connects the hinged lever clutch 1 to the tooth clutch 2 and has an axial throughgoing hollow space. The thrust ring 24 forms a seat for a sealing ring 25 which surrounds the intermediate shaft 3 and a limiting element for axial relative movements between the tooth clutch 2 and the intermediate shaft 3. In addition to the sealing ring 25 between the intermediate shaft 3 and the thrust ring 24, a sealing ring 26 is arranged radially between a hollow shaft-like projection of the cover 23 and the inner clutch element 22. In the present exemplary embodiment, the inner clutch element 22 is formed integrally onto the intermediate shaft 3 and forms a seat for the sealing ring 26 which is connected to the cover 23.

In the present exemplary embodiment, the intermediate shaft 3 is of two-piece configuration. A first shaft section 31 of the intermediate shaft 3 is connected to the second connecting flange 12 of the hinged lever clutch 1, while the inner clutch element 22 of the tooth clutch 2 is formed internally onto a second substantially hollow shaft-like shaft section 32 of the intermediate shaft 3. The two shaft sections 31, 32 of the intermediate shaft 3 are initially centered on one another by connecting pins 34 inserted into holes on the shaft sections 31, 32, and are subsequently connected fixedly by screws 33. The screws 33 can be released again when the clutch device is intended to undergo servicing or maintenance work.

The tooth clutch 2 and the hinged lever clutch 1 have restoring forces which are adapted to one another in such a way that, in the case of a radial displacement, the clutch device has both central running and axial offset compensation. As a result of electrically insulating materials on or in rod elements 13 which are connected to the connecting flanges 11, 12 of the hinged lever clutch 1, a current flow through a transmission which is connected to the clutch device can be avoided.

Figure 2:
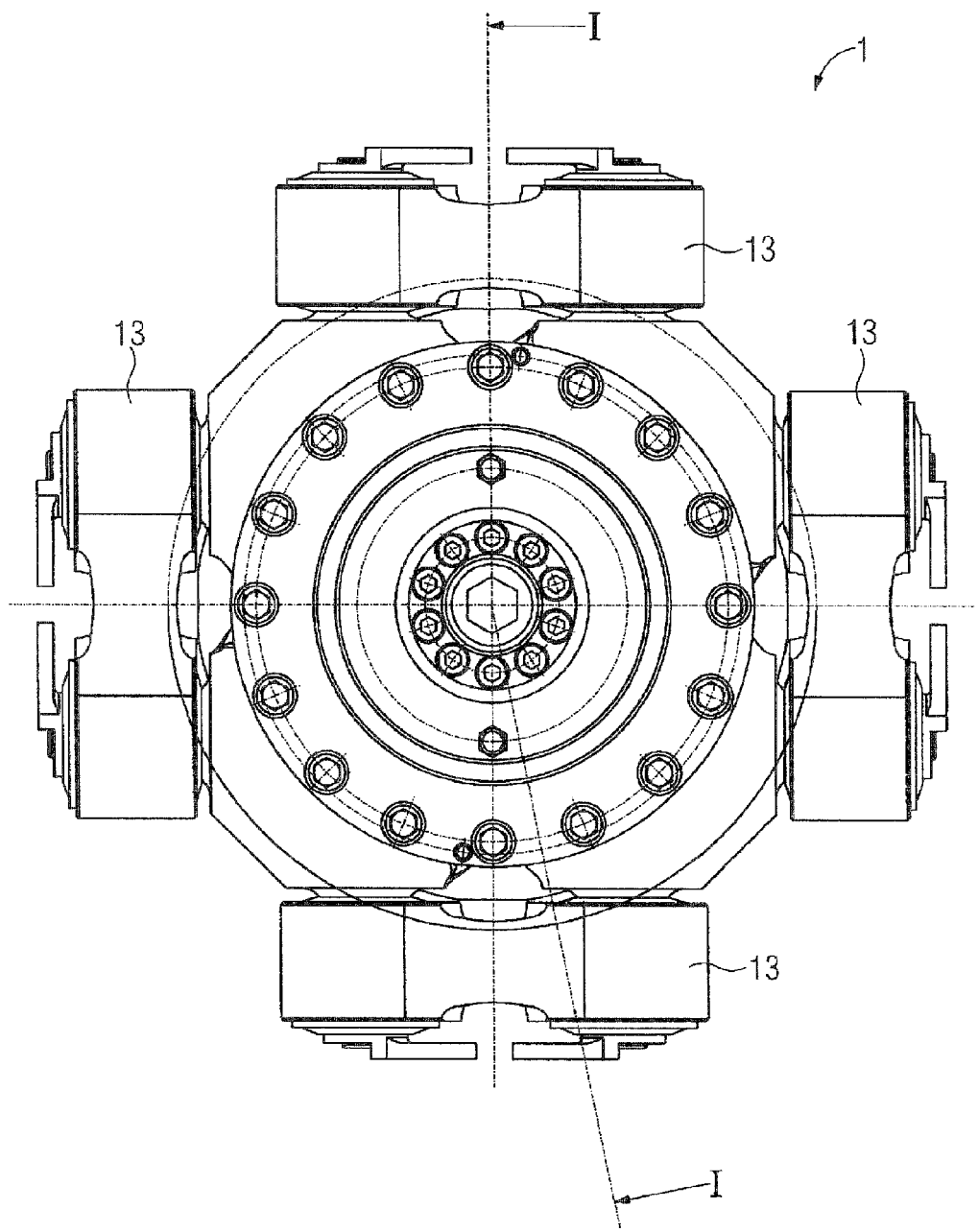
FIG. 2 is a side view of the hinged lever clutch of the clutch device of FIG. 1.

It can be seen using FIGS. 2 and 3, in addition to the connecting flanges 11, 12, the hinged lever clutch 1 comprises rod elements 13 which are connected to bearing journals of the connecting flanges 11, 12. Elastomeric, electrically insulating bushes 14 are mounted onto the bearing journals by securing pieces 15, respectively, and are arranged between the bearing journals which are formed integrally onto the connecting flanges 11, 12 and those holes of the rod elements 13 which surround them.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A clutch device for connecting a driving machine part to a driven machine part, said clutch device comprising;
   an elastic clutch arranged on one member selected from the group consisting of a first drive-side and an output-side end section of the clutch device;
   a tooth clutch arranged on another member of the group; and
   an intermediate shaft which connects the elastic clutch to the tooth clutch,
   wherein the tooth clutch and the elastic clutch have restoring forces which are adapted to one another in such a way that the clutch device has both a central running and an axial offset compensation in the case of a radial displacement,
   wherein the elastic clutch is elastomeric,
   wherein the intermediate shaft is configured as a two-piece shaft with a first shaft section and a second shaft section,
   wherein the shaft sections of the intermediate shaft are releasably connected with one another, and
   wherein the intermediate shaft has an axial throughgoing hollow space.

2. The clutch device of claim 1, wherein the tooth clutch is integrated into a transmission hollow shaft.

3. The clutch device of claim 2, wherein the tooth clutch comprises an inner clutch element and an outer clutch element, with the outer clutch element forming an extension of the transmission hollow shaft.

4. The clutch device of claim 1, wherein the tooth clutch is mounted in front of a transmission hollow shaft.

5. The clutch device of claim 4, wherein the tooth clutch comprises an inner and an outer clutch element, with the outer clutch element forming an extension of the transmission hollow shaft.

6. The clutch device of claim 5, wherein the outer clutch element has integrated therein a bearing seat for the transmission hollow shaft.

7. The clutch device of claim 1, wherein the tooth clutch forms a seal of a transmission.

8. The clutch device of claim 1, wherein the tooth clutch comprises an inner clutch element and an outer clutch element, and further comprising a shock absorbing thrust ring arranged between the outer clutch element and the intermediate shaft, said thrust ring forming a seat for a sealing ring which surrounds the intermediate shaft and a limiting element for axial relative movements between the tooth clutch and the intermediate shaft.

* * * * *